Nov. 11, 1958     P. P. BEY ET AL     2,860,305
PRECISION TIME MEASURING SYSTEM
Filed July 6, 1956     4 Sheets-Sheet 1
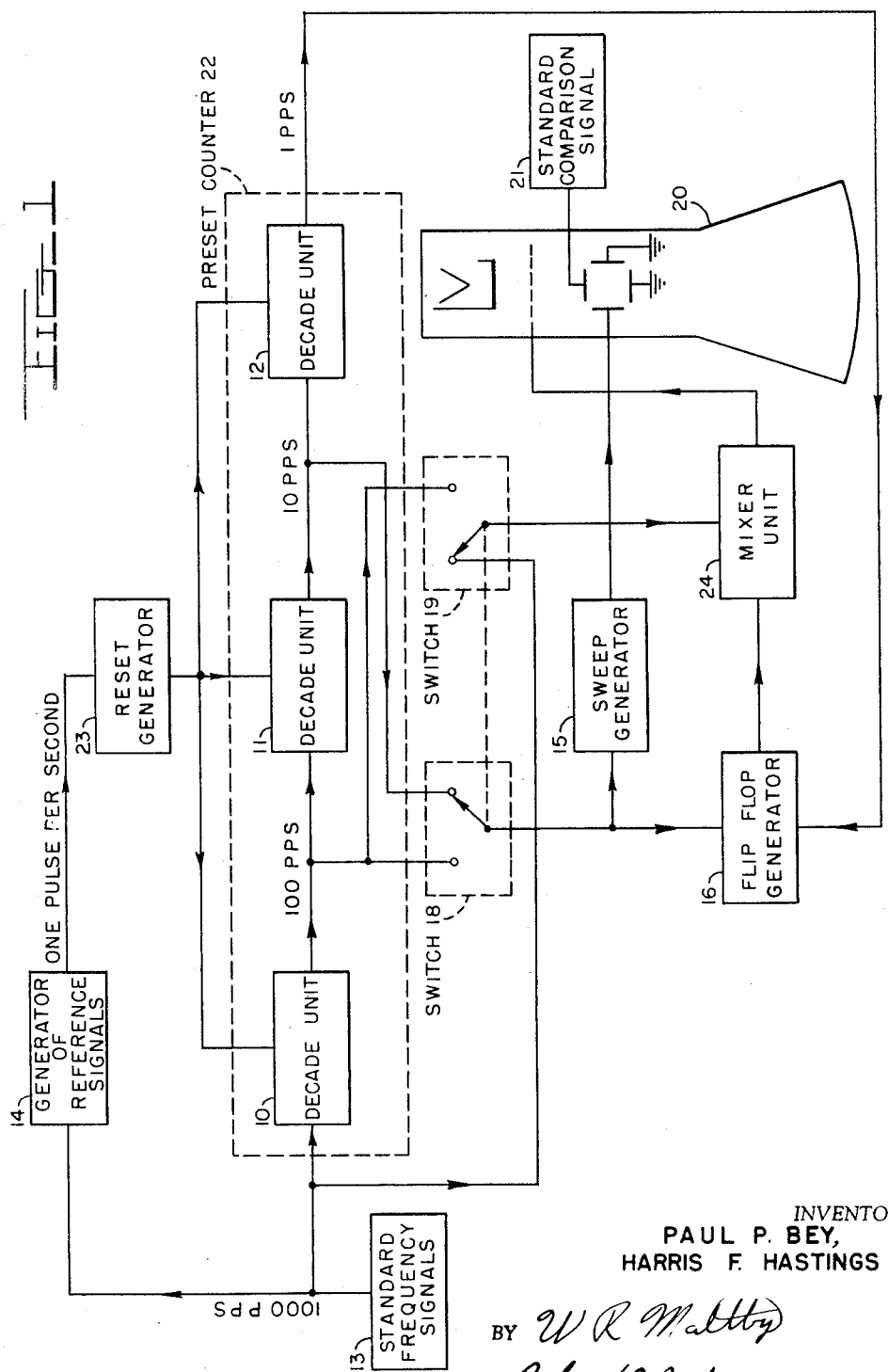
INVENTORS,
PAUL P. BEY,
HARRIS F. HASTINGS
BY *W R Maltby*
*Richard C Reed*     ATTORNEYS Nov. 11, 1958    P. P. BEY ET AL    2,860,305
PRECISION TIME MEASURING SYSTEM
Filed July 6, 1956    4 Sheets-Sheet 2
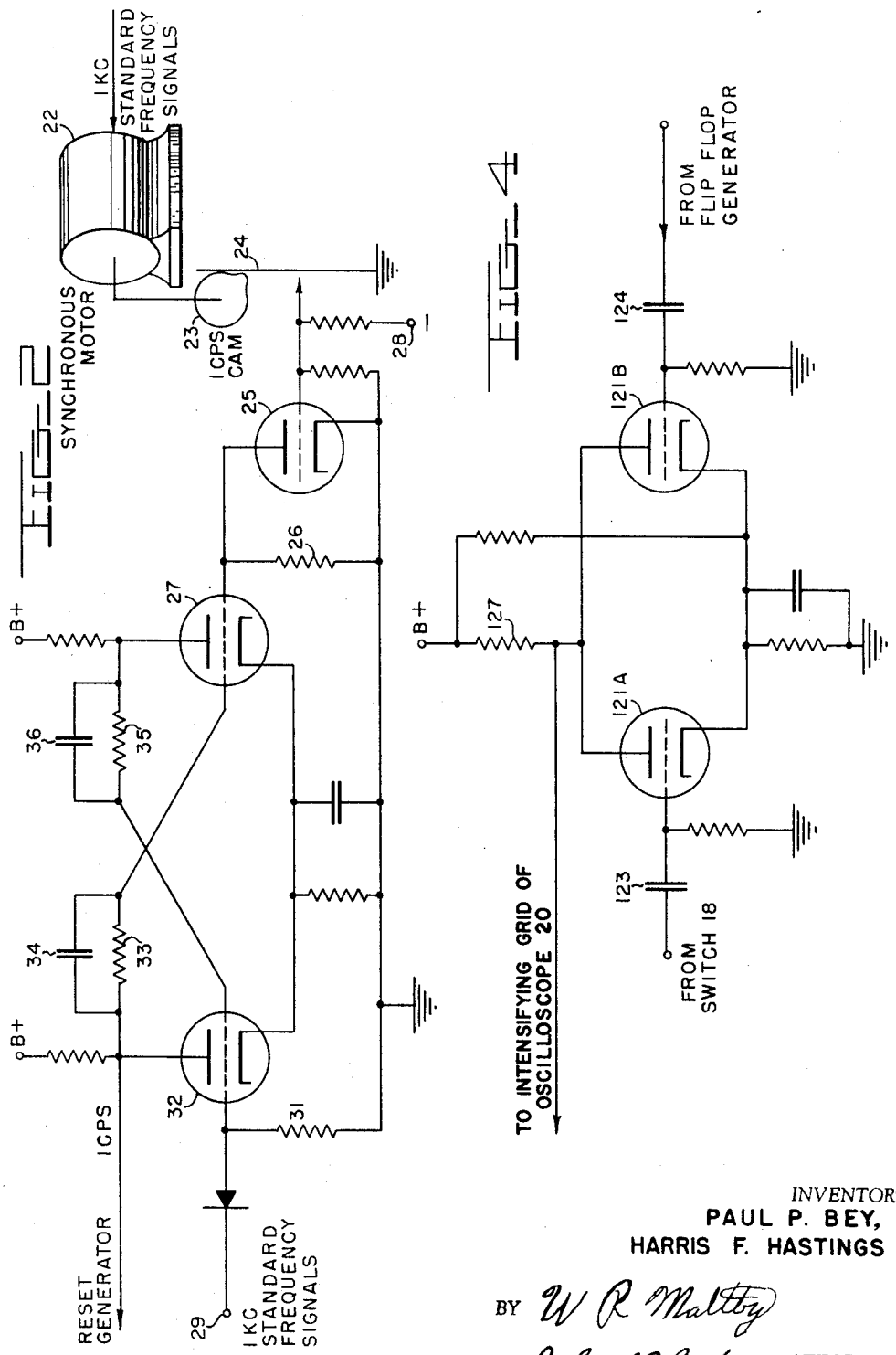
INVENTORS,
PAUL P. BEY,
HARRIS F. HASTINGS
BY *W. R. Maltby*
*Richard C. Reed*    ATTORNEY

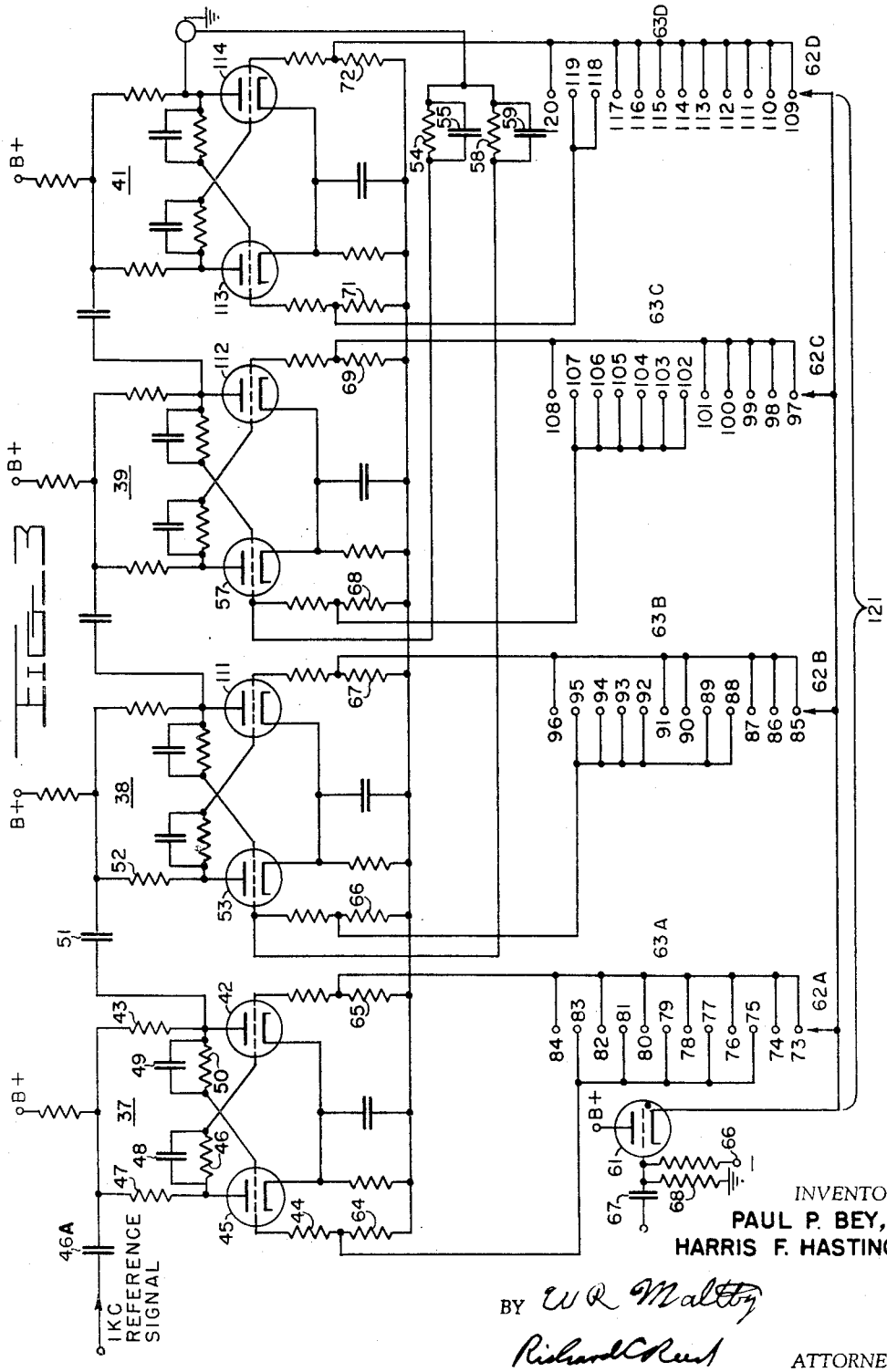

Nov. 11, 1958  P. P. BEY ET AL  2,860,305
PRECISION TIME MEASURING SYSTEM
Filed July 6, 1956  4 Sheets-Sheet 4
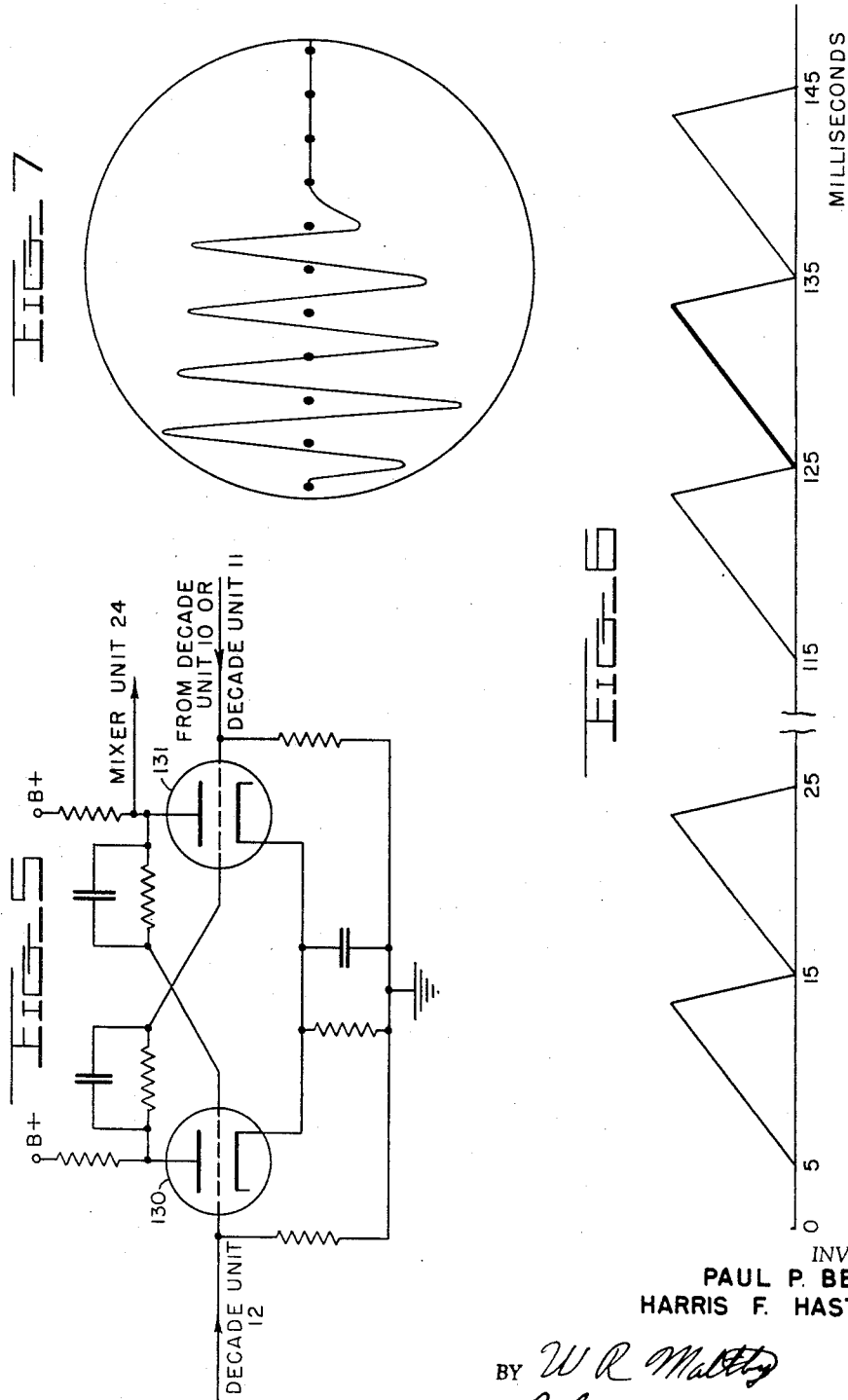
INVENTORS,
PAUL P. BEY,
HARRIS F. HASTINGS
BY
ATTORNEYS

United States Patent Office 2,860,305
Patented Nov. 11, 1958

2,860,305

PRECISION TIME MEASURING SYSTEM

Paul P. Bey, Temple Hills, Md., and Harris F. Hastings, Washington, D. C., assignors to the United States of America as represented by the Secretary of the Navy Application July 6, 1956, Serial No. 596,369

11 Claims. (Cl. 324—68)

(Granted under Title 35, U. S. Code (1952), sec. 266)

The invention described herein may be manufactured and used by or for the Government of the United States of America for governmental purposes without the payment of any royalties thereon or therefor.

The present invention relates in general to electrical signal frequency measuring devices and in particular to apparatus for determining time relationship between two signals.

It is often desired to measure the time relationship between two signals. As an example, it is frequently desired to broadcast radio signals possessing known characteristics such as frequency of carrier or modulation or both. For such purposes, it is apparent that some means of frequency sensing and control is necessary to maintain a required degree of accuracy. One way of accomplishing this end is to provide a source of reference signals operative at a known, constant frequency and to determine the relationship between such frequency and the broadcast radio signals. The relationship can be determined in several ways. However, all prior art devices for making such determinations are unduly complex, of limited accuracy, or cumbersome in use.

In accordance with the foregoing, an object of the present invention is to provide an improved frequency measuring device.

Another object of the present invention is to provide a time measuring system whereby the time relationship between two signals may be accurately measured.

Another object of the present invention is to provide a time measuring system for accurately measuring a wide range of time intervals.

Another object of the present invention is to provide a time measuring system wherein the time interval between a reference signal and a standard signal may be set up on a counter and synchronized with the reference signal.

Other objects and many of the attendant advantages of this invention will be readily appreciated as the same becomes better understood by reference to the following detailed description when considered in connection with the accompanying drawings wherein:

Fig. 1 is a block diagram of a typical embodiment of the present invention.

Fig. 2 is a detailed circuit diagram of the generator of reference signals of Fig. 1.

Fig. 3 is a detailed circuit diagram of a reset generator and decade unit of Fig. 1.

Fig. 4 is a detailed circuit diagram of the mixer unit of Fig. 1.

Fig. 5 is a detailed circuit diagram of the flip-flop generator of Fig. 1.

Fig. 6 represents the output waveform of the oscilloscope sweep generator and the manner in which the desired sweep per second is intensified.

Fig. 7 represents marker pulses and the waveform of a typical standard signal on the face of the oscilloscope.

In accordance with the present invention frequency measurement is accomplished by feeding standard frequency signals to a generator of reference signals to derive a reference signal during a desired period of time. The reference signal and the standard frequency signals are applied to a delay circuit from which control signals are derived to develop a sweep voltage and to intensify a particular sweep of an oscilloscope during the desired period of time. A standard comparison signal is applied to the oscilloscope, and the time relationship between the reference signal and the standard comparison signal is determined by whether the standard comparison signal appears on the face of the oscilloscope when the particular sweep is intensified. When the time relationship between the reference signal and the standard comparison signal is known, the frequency relationship between the two signals can be easily determined; and since the standard frequency signal has the same accuracy as the reference signal, the relationship between the standard frequency signal and the standard comparison signal can likewise be easily determined.

In one embodiment of the present invention, a desired delay is set up on a preset counter and reference signals occurring once per second are fed to the preset counter to obtain a plurality of control signals. A first control signal initiates the operation of an oscilloscope sweep generator and gates a flip-flop generator. A second control voltage operates the flip-flop generator to generate a control voltage that is fed to the intensifying grid of the oscilloscope through a mixer unit to brighten a selected sweep each second. The time of occurence of the second control voltage relative to the reference signal, and thus the sweep to be brightened, is determined by the delay set up on the preset counter. A third control signal is obtained from the preset counter or from a source of standard frequency signals and is fed to the mixer unit where it is superimposed upon the control voltage obtained from the flip-flop generator to form marker signals. A standard comparison signal is applied to the oscilloscope and is visible only if it occurs when the sweep is intensified. Hence the time relationship between the standard comparison signal and the reference signal is determined by the marker signals and the delay set up on the preset counter.

Referring to Fig. 1, a particular embodiment of the present invention is shown wherein the time relationship between 1 C. P. S. reference signals and 1 C. P. S. standard comparison signals is determined.

Decade units 10, 11 and 12 comprise a 1000:1 preset counter 22 driven by 1 kc. pulses from the source of standard frequency signals 13. The preset counter 22 includes a selector switch 121, shown in Fig. 3, which may be positioned to store information on preset counter 22 that represents a desired delay. The generator of reference signals 14 is controlled by the source of standard frequency signals 13 to derive 1 C. P. S. reference signals that are fed to reset generator 23 to reset the preset counter 22 once each second to the condition representing the desired delay. Switch 18 is positioned to simultaneously feed signals derived either from the output of decade unit 10 or the output of decade unit 11 to sweep generator 15 and flip-flop generator 16. The first signal fed to sweep generator 15 after the first reference signal to preset counter 22 initiates operation of sweep generator 15 and thereafter the sweep is locked to the output of the selected decade unit. The first signal fed to flip-flop generator 16 cooperates with a signal from decade unit 12 to generate a control voltage that is fed to mixer unit 24. Switch 19 is positioned to feed marker pulses from the source of standard frequency signals 13 or decade unit 10, as desired, to mixer unit 24. The output of mixer unit 24 which includes marker pulses superimposed upon the control voltage is fed to the intensifying grid of oscilloscope 20.

To understand the operation of the time measuring system assume that it is desired to measure the time of occurence of a 1 C. P. S. reference signal relative to 1 C. P. S. standard comparison signal. The selector switch 121 shown in Fig. 3, of each decade unit in the preset counter is set as shown below in Table 1. If the time difference between the 1 C. P. S. reference signal and the standard signal is estimated to be 125 milliseconds, the selector switch 121 in decade unit 10 is set on position 6 to give a delay of 5 milliseconds; the selector switch 121 in decade unit 11 is set in position 4 to give a delay of 20 milliseconds and the selector switch 121 of decade unit 12 is set to position 3 to give a delay of 100 milliseconds.

Table 1

| Decade Unit | Number of pulses following zero-count state | Position of Selector Switch 121 | Delay (milliseconds) | Stages 1 | 2 | 3 | 4 |
|---|---|---|---|---|---|---|---|
| 10 | 0 | 12 | Off | R | R | R | R |
|  | 0 | 11 | 10 | R | R | R | R |
|  | 1 | 10 | 9 | L | R | R | R |
|  | 2 | 9 | 8 | R | L | R | R |
|  | 3 | 8 | 7 | L | L | R | R |
|  | 4 | 7 | 6 | R | R | L | R |
|  | 5 | 6 | 5 | L | R | L | R |
|  | 6 | 5 | 4 | R | L | L | R |
|  | 7 | 4 | 3 | L | L | L | R |
|  | 8 | 3 | 2 | [1] (R | L | L | L) |
|  | 9 | 2 | 1 | L | L | L | L |
|  | 0 | 1 | [2] Z | R | R | R | R |
| 11 | 0 | 12 | Off | R | R | R | R |
|  | 0 | 11 | 90 | R | R | R | R |
|  | 10 | 10 | 80 | L | R | R | R |
|  | 20 | 9 | 70 | R | L | R | R |
|  | 30 | 8 | 60 | L | L | R | R |
|  | 40 | 7 | 50 | R | R | L | R |
|  | 50 | 6 | 40 | L | R | L | R |
|  | 60 | 5 | 30 | R | L | L | R |
|  | 70 | 4 | 20 | L | L | L | R |
|  | 80 | 3 | 10 | [1] (R | L | L | L) |
|  | 90 | 2 | 0 | L | L | L | L |
|  | 0 | 1 | [2] Z | R | R | R | R |
| 12 | 0 | 12 | Off | R | R | R | R |
|  | 0 | 11 | 900 | R | R | R | R |
|  | 100 | 10 | 800 | L | R | R | R |
|  | 200 | 9 | 700 | R | L | R | R |
|  | 300 | 8 | 600 | L | L | R | R |
|  | 400 | 7 | 500 | R | R | L | R |
|  | 500 | 6 | 400 | L | R | L | R |
|  | 600 | 5 | 300 | R | L | L | R |
|  | 700 | 4 | 200 | L | L | L | R |
|  | 800 | 3 | 100 | [1] (R | L | L | L) |
|  | 900 | 2 | 0 | L | L | L | L |
|  | 0 | 1 | [2] Z | R | R | R | R |

[1] This state of conduction results from feedback.
[2] Positioned to by-pass decade units.

Switch 19 is positioned to simultaneously feed 100 pulses per second from decade unit 10 to sweep generator 15 and flip-flop generator 16. The 1 kc. standard frequency signals are fed to decade unit 10, and the first output pulse from decade unit 10 after the first input reference signal to preset counter 22 initiates operation of sweep generator 15. Thereafter the sweep of sweep generator 15 is locked to the output of decade unit 10. As shown in Fig. 6, the sweep of generator 15 is initiated 5 milliseconds after the 1 C. P. S. reference signal is fed to decade unit 10 and the duration of the sweep is 10 milliseconds. As shown in Fig. 5, flip-flop generator 16 includes a trigger circuit having a right-hand section and a left-hand section. The first pulse that initiates operation of sweep generator 15 is fed to flip-flop generator 16 to hold the right-hand section of the trigger circuit in the conducting state. One hundred and twenty milliseconds later a pulse is fed from decade unit 12 to flip-flop generator 16 to force conduction in the left-hand section of the trigger circuit, thus forming the leading edge of a rectangular positive control voltage at the plate of the right-hand section of the circuit. The next pulse fed 10 milliseconds later from decade unit 10 to flip-flop generator 16 forces conduction in the right hand section, thus forming the trailing edge of the positive rectangular control voltage which is fed to mixer unit 24 where it is combined with marker pulses derived from the source of standard frequency signals 13. Since it is desired to divide the 10 multisecond positive rectangular control voltage obtained from flip-flop generator 16 into ten equal parts, switch 19 is positioned to feed 1000 pulses per second from the source of standard frequency signals 13. The output signal from mixer unit 24 is fed to the intensifying grid of oscilloscope 20; and as shown in Fig. 6, the positive rectangular control voltage brightens the particular sweep of sweep generator 15 that occurs 125 milliseconds after the 1 C. P. S. reference signal fed to decade unit 10. As shown in Fig. 7, the marker pulses divide the particular sweep on the face of the oscilloscope into ten equal parts. The 1 C. P. S. standard comparison signal, which is applied to oscilloscope 20, appears on the fact of the tube, as shown in Fig. 7, only if it occcurs when the particular sweep is intensified. Hence, the time difference between the 1 C. P. S. reference signal and the standard comparison signal is determined by the delay set up on the preset counter 22 and the location of the standard comparison signal on the face of the tube relative to the marker pulses. In the example given, since the delay set up on the preset counter 22 is 125 milliseconds and down sweep of the standard comparison signal on the face of the tube intersects the fourth marker pulse, the time difference between the occurrence of the 1 C. P. S. reference signals and the standard signals is 129 milliseconds. From Table 1 above, it is seen that in this particular embodiment of the present invention a time difference of 0 to 999 milliseconds between the 1 C. P. S. reference signal and the 1 C. P. S. standard comparison signal can be accurately measured.

Referring to Fig. 2, it is noted that the 1 kc. standard frequency signals are fed to a synchronous motor to drive a cam that gates a flip-flop circuit once per second. The 1 kc. standard frequency signals are also fed directly to and operate the flip-flop circuit to generate signals having a predetermined duration and a recurrence rate of one pulse per second with the same accuracy as the 1 kc. standard frequency reference signals.

The 1 kc. standard frequency signals derived from the source of standard frequency signals 13 control the synchronous motor 22 which in turn drives the 1 C. P. S. cam 23. During the time that contact 24 is closed, the grid of electron tube 25 is at ground potential and electron tube 25 conducts lowering the voltage across resistor 26 holding electron tube 27 at cut-off. When contact 24 is opened electron tube 25 is cut-off by the negative bias connected to terminal 28. Thereafter the first 1 kc. reference signal fed to terminal 29 from the source of standard frequency signals 13 applies a negative signal across resistor 31 to the grid of electron tube 32. Electron tube 32 is cut off and a positive pulse is applied through resistor 33 and capacitor 34 to the grid of electron tube 27 causing this tube to conduct. Electron tube 27 continues to conduct until the 1 C. P. S. cam 23 permits contact 24 to close removing the negative bias from the grid of electron tube 25 which in turn lowers the voltage across resistor 26 to cut off electron tube 27. The foregoing operation of the generator of reference signals 14 results in a positive rectangular voltage at the plate of electron tube 32, the leading edge of which is coincident with the first 1 kc. standard reference signal fed to terminal 29 after contact 24 is opened and whose trailing edge is coincident with the closing of contact 24. Hence, the accuracy of the beginning of the positive rectangular voltage is the same as that of the 1 kc. standard frequency signal and its duration is determined by the time contact 24 is open.

Decade unit 10, decade unit 11 and decade unit 12, shown in Fig. 1, are substantially the same as the decade unit disclosed in detail in Fig. 3 and are controlled by reset generator 23 in the same manner shown in this figure.

Referring to Fig. 3, the decade unit shown includes four substantially identical binary stages 37, 38, 39 and 41 which are essentially Eccles-Jordan trigger circuits having direct current cross-coupling between the anodes and grids of the electron tubes. The grid circuit of each electron tube in the four binary stages 37, 38, 39 and 41 is connected through the wafers 62A, 62B, 62C and 62D of a single pole 12 position selector switch to the cathode of electron tube 61 of reset generator 14 so that by positioning selector arms 63A, 63B, 63C and 63D of the selector switch a predetermined delay may be set up on the decade unit.

To understand the operation of each binary stage, assume that the right-hand section, electron tube 42 of the first binary stage 37 is conducting. There is a voltage drop across plate resistor 43 which is coupled through resistor 50 and capacitor 49 to the grid of electron tube 45, the left-hand section of binary stage 37. The coupled negative voltage with the aid of bias resistors 44 and 64 holds electron tube 45 to cut-off. Since the grid of electron tube 42 is maintained at positive potential through coupling resistor 46, stable conduction is maintained through electron tube 42.

The 1 kc. standard frequency signals derived from the source of standard frequency signals 13 are coupled through capacitor 46 and plate resistor 47 to the first binary stage 37. Since the reference signals have negative polarity, the first signal through capacitor 46A and resistor 47 cuts off the electron tube 42 and the negative bias on electron tube 45 is simply increased. With both electron tube 42 and electron tube 45 non-conducting the only information left concerning the former conducting state is the voltage across capacitor 48 and the voltage across capacitor 49. The greater charge and voltage is carried by capacitor 48 because of the higher initial potential difference due to the flow of grid current at the lower end. Upon termination of the negative 1 kc. standard frequency signal, the grids of both electron tube 42 and electron tube 45 approach a more positive value determined by their respective resistance networks but owing to the greater charge on capacitor 48, the grid of electron tube 45 connected to capacitor 49 is the first to go above cut-off. By coupling through capacitor 48, conduction in electron tube 45 causes regenerative switch over so that electron tube 45 is conducting and electron tube 42 is nonconducting. Each successive 1 kc. standard frequency signal fed to the input of binary stage 37 reverses the stage of conduction and gives binary action.

By coupling the plate of electron tube 42 of the first binary stage 37 through capacitor 51 and resistor 52 to the plate of the second binary stage 38, a negative pulse is applied to the second binary stage 38 when the right-hand section or electron tube 42 of the first binary stage 37 goes into conduction.

Since positive pulses do not trigger a binary stage, the second binary stage 38 receives only half as many switching pulses as the first binary stage 37 and thus a scale of two is formed. The four similar binary stages 37, 38, 39 and 41 provides a scaling factor of 16.

To obtain decimal scaling, a triggernig pulse derived from the output of the fourth binary stage 41 is fed through coupling resistor 58 and condenser 59 to the grid of electron tube 53 in the second binary stage 38. Similarly, a triggering pulse from the fourth binary stage 41 is fed back to the grid of electron tube 57 in the third binary stage 39 through coupling resistor 54 and condenser 55. These feedback pulses are applied in such a manner that switch-over in the second binary stage 38 and in the third binary stage 39 occurs once during a counting cycle of 10.

Since two input pulses are required to switch the second binary stage 38 and four input pulses are necessary to switch the third binary stage 39, the feedback is equivalent to adding six pulses for every ten input pulses to the decade unit.

In other words, decade unit 10 derives 100 cycle pulses from the 1 kc. standard frequency signal input by dividing 1600 counts by 16, decade unit 11 derives 10 cycle pulses from the 100 cycle input from decade unit 10 by dividing 160 counts by 16, and a one cycle pulse is derived by decade unit 12 from the 10 cycle input from decade unit 11 by dividing 16 counts by 16.

The cathode of electron tube 61, which may be a thyratron, is connected to each selector arms 62A, 62B, 62D and 62D of the selector switch. Each of the four wafers 63A, 63B, 63D and 63D is associated with one of the four binary stages 37, 38, 39 and 41. Thus the cathode of electron tube 61 is connected to resistor 64 in the grid circuit of electron tube 45 or to resistor 65 in the grid circuit of electron tube 42 depending upon the location of selector arm 62A on wafer 63A.

Electron tube 61 is maintained in a stable non-conducting state by the negative bias applied to terminal 66. The leading edge of the rectangular voltage developed by the generator of reference signals 14 is differentiated to obtain a positive triggering pulse which is fed through capacitor 67 and resistor 68 at the grid of electron tube 61. This pulse, which occurs coincident with the leading edge of the rectangular reference signal, fires electron tube 61 and the position of the selector arms 62A, 62B, 62C, and 62D determines whether current will flow and a large positive voltage of short duration will be developed across resistor 64 or resistor 65 of the first binary stage 37, resistor 66 or resistor 67 of the second binary stage 38, resistor 68 or resistor 69 of the third binary stage 39 and resistor 71 or resistor 72 of the fourth binary stage 41. This, of course, will determine whether the right-hand section or the left-hand section of each binary stage will conduct.

The conducting sequence of each decade unit 10, 11 and 12 in the preset counter 22 is shown above in Table 1. In this table, R indicates that the right-hand section of the binary stage, for example, electron tube 42 in binary stage 37 is conducting; and L indicates that the left-hand section or electron tube 45 of the binary stage is conducting.

If it is desired to obtain a delay of 2 milliseconds from decade unit 10, the selector switch, as shown in Table 1, is placed in position 3. In this position, as shown in Fig. 3, selector arm 62A is on terminal 75, selector arm 62B is on terminal 87, selector arm 62C is on terminal 99 and selector arm 62D is on terminal 110. As shown in Fig. 1, the 1 kc. standard frequency signal is applied simultaneously to generator of reference signals 14 and to decade unit 10. Therefore, the reset pulse obtained from the output of electron tube 61 (coincident with the leading edge of the rectangular output voltage of generator of reference signals 14) and one pulse of the 1 kc. standard frequency signal input to decade unit 10 occur simultaneously. The amplitude of the reset pulse, however, is so large that it overwhelms the effect of the 1 kc. standard frequency signal occurring simultaneously and forces conduction in the binary stages as shown in Table 1. Accordingly, the right-hand section or electron tube 42 in the first binary stage 37 will conduct, the left-hand section or electron tube 53 in the second binary stage 38 will conduct, the left-hand section or electron tube 57 in the third binary stage 39 will conduct, and the left-hand section or electron tube 113 in the fourth binary stage 41 will conduct. As indicated by Table 1, the second 1 kc. standard frequency signal fed to decade unit 10 after the reset pulse will cause the fourth binary stage 41 to change from the L to R conducting state producing an output pulse occurring two milliseconds after the first 1 kc. standard frequency signal fed to decade unit 10. Hence the first 1 kc. standard frequency signal fed to decade unit 10 is delayed two milliseconds.

Because of the cyclic recurrence of the conducting sequences of the binary stages, every second of time or every 1000th 1 kc. standard frequency signal, the desired delay will be set up on the decade unit and the cycle of operation described immediately above will reoccur. Accordingly, after the desired delay has been set up on the decade counter, it would be possible to remove the reset generator 14 and selector switch from the circuit shown in Fig. 3. However, since counts introduced by transients could change the cyclic conducting sequence of the binary stages, it is advantageous to continue applying the reset pulses every second to insure that the desired delay will be maintained.

The principal function of sweep generator 15 shown in Fig. 1 is to produce a sawtooth sweep voltage for oscilloscope 20. The sweep voltage is controlled by periodically occurring pulses derived from the decade units. Thus, the sweep period is 10 or 100 milliseconds depending on whether selector switch 18, shown in Fig. 1, is positioned to obtain the driving pulses from decade unit 10 or from decade unit 11. These pulses are coupled to the grid of a thyratron in a sawtooth sweep generator circuit of the type disclosed on pages 69 to 73 of "Principles of Radar," Third Edition, by J. Francis Reintzes and Godfrey T. Coates. The output voltage is taken from the plate of the thyratron and fed to oscilloscope 20.

As shown in Fig. 1, the pulses obtained from the decade units, as selected by switch 18 are fed to flip-flop generator 16. Under control of these pulses and the pulses obtained from the output of decade unit 12, flip-flop generator 16 develops an intensifying voltage that is fed through mixer unit 24 to the intensifying grid of oscilloscope 20. The intensifying voltage brightens a desired sweep of sweep generator 15 each second.

Referring to Fig. 5, it is seen that flip-flop generator 16 includes a trigger circuit in which a pair of electron tubes are cross coupled so that current conduction is stable in one or the other electron tube. The positive output pulses of either decade unit 10 or decade unit 11 are fed through switch 18 to the grid of electron tube 131 or the right-hand section and the output of decade unit 12 is fed to the grid of electron tube 130 or the left-hand section.

To understand the operation of flip-flop generator 16, assume that switch 18 is positioned to feed 100 pulses per second from decade unit 10 to flip-flop generator 16. The first pulse fed from decade unit 10 to the flip-flop generator 16 will hold the right-hand section or electron tube 131 in the conducting state. The first pulse thereafter fed to the flip-flop generator 16 from decade unit 12 will switch the circuit to left-hand conduction where it remains until the next pulse from decade unit 10 is fed to flip-flop generator 16 to force conduction in the right-hand section. The second pulse fed from decade unit 12 to flip-flop generator 16 will again switch conduction to the left-hand section. Thus, a positive rectangular output voltage of 10 millisecond duration, which is delayed relative to the 1 C. P. S. reference signal by an amount introduced by the preset counter, appears at the plate of electron tube 131. This positive rectangular output voltage is fed to mixer unit 18.

Mixer unit 18, shown in detail in Fig. 4, superimposes marker pulses obtained from preset counter 22 on the positive rectangular voltage obtained from flip-flop generator 16. The marker pulses are obtained from the source of standard frequency signals 13 or decade unit 11 depending upon the position of switch 19 and are fed to the grid of electron tube 121A through capacitor 123. The positive rectangular voltage obtained from flip-flop generator 16 is fed to the grid of electron tube 121B through capacitor 124. The output voltage of mixer unit 24, obtained from the plate of electron tube 121A and the plate of electron tube 121B, is fed to the intensifying grid of oscilloscope 20. The rectangular portion of the output voltage intensifies a selected sweep of sweep generator 15 once per second and the marker pulses appear as intensified points, dividing the sweep into ten equal parts. If, for example, it is desired to intensify a particular sweep of a sweep voltage having 100 cycles per second, and to divide the selected sweep into ten equal parts, then switch 18 is positioned to feed 100 cycles per second from decade unit 10 simultaneously to sweep generator 15 and flip-flop generator 16 and switch 19 is positioned to feed 1000 pulses per second from the source of standard frequency signals 13 to mixer unit 24.

Although the particular embodiment of the present invention disclosed herein employs electron tubes, transistors, in appropriate transistor circuits, could be substituted therefor without exceeding the scope of this invention.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. In a time measuring system, a source of standard frequency signals, means for producing delayed signals relative to said standard frequency signals including a first control signal and a second control signal having a desired time relationship, means applying said standard frequency signals to said first mentioned means to produce said first control signal and said second control signal, an oscilloscope, first generating means providing a sweep signal for said oscilloscope having a predetermined number of cycles per second, selecting means providing a second ouput signal, second generating means for providing an intensifying signal for said oscilloscope, means for applying said first control signal to said first generating means and to said second generating means to initiate operation of said first generating means to develop said sweep signal and to condition said second generating means for operation, means for applying said second control signal to said second generating means to develope said intensifying signal, a source of standard comparison signals, means for applying said sweep signal to said oscilloscope, means for applying said intensifying signal to said oscilloscope to intensify a particular cycle of said sweep signal, and means for applying a standard comparison signal from said source of standard comparison signals to said oscilloscope whereby said standard comparison signal appears upon the face of said oscilloscope when said particular cycle is intensified.

2. In a time measuring system, a source of standard frequency signals, means for producing delayed signals relative to said standard frequency signals including a first control signal, a second control signal and third control signals having desired time relationships, means for applying said standard frequency signals to said first mentioned means to produce said first control signal, said second control signal and said third control signals, an oscilloscope, a first generator for providing a sweep signal for said oscilloscope having a predetermined number of cycles per second, a second generator for providing an intensifying signal for said oscilloscope, means for applying said first control signal to said first generator and to said second generator to initiate operation of said first generator and to condition said second generator for operation, means for applying said second control signal to said second generator to develope said intensifying signal, a source of standard comparison signals, means for applying said sweep signal to said oscilloscope, means for applying said intensifying signal to said oscilloscope to intensify a particular cycle of said sweep signal, means for applying said third signals to said oscilloscope to divide said particular cycle into a desired number of intervals, and means for applying a standard comparison signal from said source of standard comparison signals to said oscilloscope, whereby said standard comparison signal appears upon the face of said oscilloscope when said particular cycle is intensified.

3. In a time measuring system, a source of standard frequency signals, a first generating means for providing a reference signal substantially in coincidence with only the first standard frequency signal applied to said first generating means from said source of standard frequency signals during a desired interval of time, means for applying said standard frequency signals during said desired intervals of time to produce said reference signal, delay means for delaying a signal a predetermined length of time, means for applying said reference signal to said delay means, means for applying said standard frequency signals to said first generator and to said delay means during said desired interval of time to develop a first control signal and a second control signal having a predetermined time relationship, an oscilloscope, second generatnig means providing a sweep signal for said oscilloscope having a predetermined number of cycles per second, selecting means providing a second output signal, third generating means for providing an intensifying signal for said oscilloscope, means for applying said first control signal to said second generating means and to said third generating means to initiate operation of said second generating means to develope said sweep signal and to condition said third generating means for operation, means for applying said second control signal to said third generating means to develope said intensifying signal, a source of standard comparison signals, means for applying said sweep signal to said oscilloscope, means for applying said intensifying signal to said oscilloscope to intensify a particular cycle of said sweep signal, and means for applying a standard comparison signal from said source of standard comparison signals to said oscilloscope whereby said standard comparison signal appears upon the face of said oscilloscope when said particular cycle is intensified.

4. In a time measuring system, a source of standard frequency signals, a first generator for providing a reference signal substantially in coincidence with only the first standard frequency signal applied to said first generator from said source of standard frequency signals during a desired interval of time, means for applying said standard frequency signals during said desired interval of time to produce said reference signal, delay means for delaying a signal a predetermined length of time, means for applying said reference signal to said delay means, means for applying said standard frequency signals to said first generator and to said delay means during said desired interval of time to develop a first control signal, a second control signal and third control signals having predetermined time relationships, an oscilloscope, a second generator for providing a sweep signal for said oscilloscope having a predetermined number of cycles per second, a third generator for providing an intensifying signal for said oscilloscope, means for applying said first control signal to said second generator and to said third generator to initiate operation of said second generator and to condition said third generator for operation means for applying said second control signal to said third generator to develope said intensifying signal, a source of standard comparison signals, means for applying said sweep signal to said oscilloscope, means for applying said intensifying signal to said oscilloscope to intensify a particular cycle of said sweep signal, means for applying said third signals to said oscilloscope to divide said particular cycle into a desired number of intervals, and means for applying a standard comparison signal from said source of standard comparison signals to said oscilloscope, whereby said standard comparison signal appears upon the face of said oscilloscope when said particular cycle is intensified.

5. In a time measuring system, a source of standard frequency signals, a first generating means for providing a reference signal substantially in coincidence with only the first standard frequency signal applied to said first generator from said source during a desired interval of time, means for applying said standard frequency signals during said desired interval of time to produce said reference signal, delay means for delaying a signal for one of a plurality of time intervals, means for conditioning said delay means to delay a signal for a selected time interval of said plurality of time intervals, means for applying said reference signal to said conditioning means to condition said delay means to delay a signal for said selected time interval, means for applying said standard frequency signals to said first generator and to said delay means during said desired interval of time to develope a first control signal and a second control signal having a predetermined time relationship, second generating means for providing a first output signal having a predetermined number of cycles per second, selecting means providing a second output signal, means for applying said first control signal to said second generating means and to said selecting means to initiate operation of said second generating means to develope said first output signal and to condition said selecting means for operation, means for applying said second control signal to said selecting means to operate said selecting means to develope said second output signal, a utilization device, and means for applying said first output signal and said second output signal to said utilization device to select a particular cycle of said first output signal.

6. In a time measuring system, a source of standard frequency signals, a first generating means for providing a reference signal substantially in coincidence with only the first standard fbrequency signal applied to said first generating means frcm said source of standard frequency signals during a desired interval of time, means for applying said standard frequency signals during said desired interval of time to produce said reference signal, delay means for delaying a signal for one of a plurality of time intervals, means for conditioning said delay means to delay a signal for a selected time interval of said plurality of time intervals, means for applying said reference signal to said conditioning means to condition said delay means to delay a signal for said selected time interval, means for applying said standard frequency signals to said first generating means and to said delay means during said desired interval of time to develope a first control signal and a second control signal having a predetermined time relationship, an oscilloscope, second generating means providing a sweep signal for said oscilloscope having a predetermined number of cycles per second, selecting means providing a second output signal, third generating means for providing an intensifying signal for said oscilloscope, means for applying said first control signal to said second generating means and to said third generating means to initiate operation of said second generating means to develope said sweep signal and to condition said third generating means for operation, means for applying said second control signal to said third generating means to develope said intensifying signal, a source of standard comparison signals, means for applying said sweep signal to said oscilloscope, means for applying said intensifying signal to said oscilloscope to intensify a particular cycle of said sweep signal, and means for applying a standard comparison signal from said source of standard comparison signals to said oscilloscope whereby said standard comparison signal appears upon the face of said oscilloscope when said particular cycle is intensified.

7. In a time measuring system, a source of standard frequency signals, a first generator for providing a reference signal substantially in coincidence with only the first standard frequency signal applied to said first generator from said source during a desired interval of time, means for applying said standard frequency signals during said desired interval of time to produce said reference signal, delay means for delaying a signal for one of a plurality of time intervals, means for conditioning said delay means to delay a signal for a selected time interval of said plurality of time intervals, means for applying said reference signal to said conditioning means to condition said delay means to delay a signal for said selected time interval, means for applying said standard frequency signals to said first generator and to said delay means during said desired interval of time to develope a first control signal, a second control signal and third control signals having predetermined time relationship, a second generator for providing a sweep signal for said oscilloscope having a predetermined number of cycles per second, a third generator for providing an intensifying signal for said oscilloscope, means for simultaneously applying said first control signal to said second generator and to said third generator to initiate operation of said second generator and to condition said third generator for operation, means for applying said second control signal to said third generator to develope said intensifying signal, a source of standard comparison signals, means for applying said sweep signal to said oscilloscope, means for applying said intensifying signal to said oscilloscope to intensify a particular cycle of said sweep signal, means for applying said third signals to said oscilloscope to divide said particular cycle into a desired number of intervals, and means for applying a standard comparison signal from said source of standard comparison signals to said oscilloscope, whereby said standard comparison signal appears upon the face of said oscilloscope when said particular cycle is intensified.

8. In a time measuring system, a source of standard frequency signals, a first generator for providing a reference signal substantially in coincidence with only the first standard frequency signal applied to said first generator from said source of standard frequency signals during a desired interval of time, means for applying said standard frequency signals to said first generator during said desired interval of time to produce said reference signal, delay means for delaying a signal for one of a plurality of lengths of time including a plurality of counter units connected in tandem, each of said plurality of counter units including a plurality of binary stages, each of said binary units including a first electron tube having at least a first anode, a first control element and a first cathode, and a second electron tube including at least a second anode, a second control element, and a second cathode, a first impedance connecting said first anode to a first source of positive potential relative to said first cathode, a second impedance connecting said second anode to a second source of positive potential relative to said second cathode, said first anode connected to said second control element and said second anode connected to said first control element to provide a stable state of conduction in said first electron tube or in said second electron tube, a reset generator, a plurality of selector switches selectively positioned to connect said reset generator either to said first electron tube or said second electron tube of each of said binary stages, means for applying said reference signals to said reset generator to condition said delay means to delay a signal for a selected one of said plurality of lengths of time, means for simultaneously applying said standard frequency signals to said first generator and to said delay means during said desired interval of time to develop a first control signal, a second control signal and third control signals having predetermined time relationships, an oscilloscope, a second generator for providing a sweep signal for said oscilloscope having a predetermined number of cycles per second, a third generator for providing an intensifying signal for said oscilloscope, means for applying said first control signal to said second generator and to said third generator to initiate operation of said second generator and to condition said third generator for operation, means for applying said second control signal to said third generator to develope said intensifying signal, a source of standard comparison signals, means for applying said sweep signal to said oscilloscope, means for applying said intensifying signal to said oscilloscope to intensify a particular cycle of said sweep signal, means for applying said third signals to said oscilloscope to divide said particular cycle into a desired number of intervals, and means for applying a standard comparison signal from said source of standard comparison signals to said oscilloscope, whereby said standard comparison signal appears upon the face of said oscilloscope when said particular cycle is intensified.

9. In a time measuring system, a first generator for providing a reference signal including a binary stage having a first electron tube and a second electron tube, said first electron tube having at least a first anode, a first control grid, and a cathode, said second electron tube having at least a second anode, a second control grid and a second cathode, a first impedance connecting said first anode to a first source of positive potential relative to said first cathode, a second impedance connecting said second anode to a second source of positive potential relative to said second cathode, said first anode connected to said first control grid and said second anode connected to said second control grid to provide a stable state of conduction in said first electron tube or in said second electron tube, switch contacts, a source of negative potential relative to said first cathode, means for applying said negative potential to said first electron tube when said switch contacts are closed to bias said first electron tube to cut-off and to place said second electron tube in said stable state of conduction, means for removing said negative potential from said first electron tube when said switch contacts are open, a source of standard frequency signals, means for applying a signal from said source of standard frequency signals when said switch contacts are open to bias said second electron tube to cut-off and to place said first electron tube in said stable state of conduction, a rotatable element, said switch contacts controlled by said rotatable element, driving means, means for applying said source of standard frequency signals to said driving means to rotate said rotatable element through a first angle of rotation wherein said switch contacts are closed and a second angle of rotation wherein said switch contacts are open to produce said reference signal at said second anode, delay means for delaying a signal for one of a plurality of time intervals, conditioning means for conditioning said delay means to delay a signal a selected one of said plurality of time intervals, means for applying said reference signal to said conditioning means, means for applying said source of standard frequency signals to said delay means when said switch contacts are closed to produce a first control signal, a second control signal, and third control signals having predetermined time relationships, an oscilloscope, a second generator for providing a sweep signal for said oscilloscope having a predetermined number of cycles per second, a third generator for providing an intensifying signal for said oscilloscope, means for applying said first control signal to said second generator and to said third generator to initiate operation of said second generator and to condition said third generator for operation, means for applying said second control signal to said third generator to develope said intensifying signal, a source of standard comparison signals, means for applying said sweep signal to said oscilloscope, means for applying said intensifying signal to said oscilloscope to intensify a particular cycle of said sweep signal, means for applying said third signals to said oscilloscope to divide said particular cycle into a desired number of intervals, and means for applying a standard comparison signal from said source of standard comparison signals to said oscilloscope, whereby said standard comparison signal appears upon the face of said oscilloscope when said particular cycle is intensified.

10. In a time measuring system, a source of standard frequency signals, delay means connected to said source of standard signals for providing a series of delayed signals including a first control signal and a second control signal having a desired time relationship, first signal generating means for providing a first output signal having a predetermined number of cycles per second, second signal generating means for providing a second output signal, means connected between said delay means and said first signal generating means for initiating operation of said first signal generating means in dependency on said first control signal, means connected between said delay means and said second signal generating means for conditioning said second signal generating means for operation in dependency on said first control signal, means connected between said delay means and said second signal generating means for initiating operation of said second signal generating means in dependency on said second control signal, and means connected to said second signal generating means and to said first signal generating means and responsive to said second output signal for indicating a desired cycle of said first output signal.

11. In an electrical circuit, a binary stage including a first electron tube having at least an anode, a cathode, and a control element and a second electron tube having at least an anode, a cathode and a control element, means for coupling the anode of said first electron tube to the control element of said second electron tube and the control element of said second electron tube to the anode of said first electron tube, a source of bias, means for connecting said source of bias to the control element of said second electron tube, a switch including a pair of contacts and a movable element, said pair of contacts having an open position and a closed position, means for connecting said switch to said source of bias for controlling the source of bias so that a positive bias is applied to the control element of said second electron tube when said pair of contacts are in the open condition and a negative bias is applied to the control element of said electron tube when said pair of contacts are in the closed condition, a source of signals providing standard signals, means connected between said movable element and the output of said source of standard signals for positioning said movable element in dependency on said standard signals in a first position wherein said pair of contacts are in the open condition and in a second position wherein said pair of contacts are in the closed condition, means connected between said source of signals and the control element of said first electron tube for applying said standard signals to the control element, an output circuit, and means for connecting the output circuit to said binary stage.

References Cited in the file of this patent

UNITED STATES PATENTS

| | | |
|---|---|---|
| 2,442,403 | Flory | June 1, 1948 |
| 2,604,622 | Hasbrook | July 22, 1952 |

OTHER REFERENCES

Tele-Tech and Electronic Industries, October 1953, pages 84, 85, 144. (Article by Nuban.)